[11] 3,615,766

[72] Inventors Gertraud Agnes Anna Piesslinger;
Hubertus Mathieu Johannes Josephus Kunnen, both of Emmasingel, Eindhoven, Netherlands
[21] Appl. No. 834,495
[22] Filed June 18, 1969
[45] Patented Oct. 26, 1971
[73] Assignee U.S. Philips Corporation
New York, N.Y.
[32] Priorities June 29, 1968
[33] Netherlands
[31] 6809259;
Apr. 1, 1969, Netherlands, No. 6905000

[54] LANTHANUM BORATE FIBER-OPTIC GLASS
3 Claims, No Drawings
[52] U.S. Cl. ........................................ 106/50,
106/47 Q, 350/96
[51] Int. Cl. ........................................ C03c 3/00,
C03c 13/00
[50] Field of Search ........................................ 106/50, 47, 52, 54; 350/96, 176

[56] References Cited
UNITED STATES PATENTS

| | | | |
|---|---|---|---|
| 2,434,149 | 1/1948 | De Paolis.................... | 106/47 X |
| 2,971,854 | 2/1961 | Geffcken..................... | 106/47 X |
| 3,081,178 | 3/1963 | Weissenberg et al. ........ | 106/47 |
| 3,150,990 | 9/1964 | Faulstich..................... | 106/47 |
| 3,494,354 | 2/1970 | Yokota et al. ................ | 106/52 X |
| 3,503,764 | 3/1970 | Young........................ | 106/54 |

*Primary Examiner*—Tobias E. Levow
*Assistant Examiner*—W. R. Satterfield
*Attorney*—Frank R. Trifari ABSTRACT: Glass having a high refractive index which is used as core glass of glass fibers present in a bundled form in a fiber-optic element. This glass has a composition in percent by weight between the following limits:

| | |
|---|---|
| $B_2O_3$ | 19–22 |
| $La_2O_3$ | 34–38 |
| $Al_2O_3$ | 2–5 |
| $ZrO_2$ | 6–9 |
| $Nb_2O_5$ | 8–15 |
| $Ta_2O_5$ | 4–12 |
| $ThO_2$ | 8–20 |
| $BaO$ | $\leq 6$ |
| $TiO_2$ | $\leq 3$ |

LANTHANUM BORATE FIBER-OPTIC GLASS

The invention relates to glass of a high refractive index which is suitable as a core of glass fibers which are bundled in a fiber-optic element.

In the last years such elements have often been used where pictures of a very weak brightness must be transmitted without loss of definition due to dispersion being allowed to occur. They are used, for example, in image amplifiers and television camera tubes. A bundle of a large number of fibers having a very small diameter is used in these fiber-optic elements.

The operation of such a fiber is based on the recognition of the fact that a beam of light which impinges upon one end of the fiber remains, by means of total reflection, substantially within the fiber when passing through it, and reaches the other end at substantially the same intensity. To obtain this such a fiber consists of a cylindrical core of transparent material having a high refractive index ($n_1$) which core is concentrically surrounded by a sleeve of glass having a low refractive index ($n_2$). If necessary, a layer of a different material may be provided on the outer side of the sleeve so as to avoid scattered light in the fiber plate and to obtain a definition which is as high as possible. The aim is to render the value of $n_1$ as high as possible and that of $n_2$ as small as possible in order that the critical angle $\theta$ is as large as possible, which is the angle formed by the beam of light impinging upon the fiber-optic element and the normal on the end face of the fiber. The relation: $n_0 \sin\theta = \sqrt{n_1^2 - n_2^2}$ exists between this critical angle, the refractive indices of the two types of glass and the refractive index of the ambient medium ($n_0$).

It is to be noted that in this respect cylindrical is understood to mean any closed shape, thus not only circular, but also rectangular or polygonal.

Optical fibers are manufactured in known manner starting from a ground and possibly polished rod of a glass having a high refractive index, for example, of a diameter of 2½ cms. and a length of 25 cms., by sliding an accurately fitting tube of a glass having a low refractive index on this rod and by drawing out the entire unit to fibers of the desired diameter while using heat.

There are glasses which are technologically acceptable for use as sleeve glass, which have a refractive index from 1.48 onwards. To obtain an optical fiber having a critical angle which is as large as possible so that the loss of light is as small as possible, a glass is required which can be used as a core of optic fibers and has a refractive index of at least 1.81. The choice of glasses having these high refractive indices is impeded because all known glasses more or less tend to crystallize. When drawing out the fibers there must be no trace of devitrification, because a comparatively large loss of light principally caused by dispersion occurs as a result thereof. Glasses which may be used without objection, for example, for the manufacturer of lenses because they are only pressed and subsequently ground, may be unusable for the present use, because a slight tendency to crystallization during the drawing operation carried out in two or three stages becomes manifest in impermissible crystallization.

When the fiber-optic element is used in one of the above-mentioned electronic devices, compounds of certain elements may not at all be present or only to a given maximum (pb, Cd, Se, F, Cl and Bi) in connection with poisoning of the photocathode.

A core glass is known which reasonably satisfies the above-mentioned requirements. This glass has a composition in mole percent within the following limits:

| | | |
|---|---|---|
| $GeO_2$ | 35–62 | |
| BaO | 10–30 | |
| $TiO_2$ | 0–25 | |
| $La_2O_3$ | 0–15 | |
| $ZrO_2$ | 0–10 | together at least 10. |
| $Ta_2O_5$ | 0–5 | |
| ZnO | 5–15 | |

Unfortunately these glasses react to a too great extent with the commonly used sleeve material during manufacture so that the transmission of the ultimate fiber plate is considerably decreased.

The present invention provides a class of glasses having refractive indices exceeding 1.81 and which do not have the above-mentioned drawbacks. They may be drawn out several times at a temperature between 750° and 800° C. without the risk of any crystallization. They are colorless and transparent.

The glass according to the invention is characterized in that it has a composition between the following limits in percent by weight:

| | | | |
|---|---|---|---|
| $B_2O_3$ | 19–22 | $Ta_2O_5$ | 4–12 |
| $La_2O_3$ | 34–38 | $ThO_2$ | 8–20 |
| $Al_2O_3$ | 2–5 | BaO | ≤6 |
| $ZrO_2$ | 6–9 | $TiO_2$ | ≤3 |
| $Nb_2O_5$ | 8–15 | | |

Glasses within the following range of composition, also in percent by weight, are preferred:

| | | | |
|---|---|---|---|
| $B_2O_3$ | 19–22 | $Ta_2O_5$ | 10–12 |
| $La_2O_3$ | 34–38 | $ThO_2$ | 8–20 |
| $Al_2O_3$ | 2–5 | BaO | ≤6 |
| $ZrO_2$ | 6–9 | $TiO_2$ | ≤3 |
| $Nb_2O_5$ | 8–10 | | |

The stability of these glasses is greatest within the range described above because crystallization only takes place at temperatures which are 50° C. higher. Due to the greater stability the processibility is still better because the thermal treatment is less critical.

The invention will now be described with reference to an Example of the manufacture of a fiber-optic element.

First a glass tube was made having a wall thickness of 1 to 1½ mms., an external diameter of 17½ mms. and a length of 300 mms. consisting of glass having one of the following three compositions in percent by weight

| | A | B | C |
|---|---|---|---|
| $SiO_2$ | 60.1 | 46.3 | 61.3 |
| $B_2O_3$ | 22.6 | 31.6 | 21.3 |
| $Al_2O_3$ | 3.9 | 10.0 | 7.7 |
| $Na_2O$ | 13.4 | 1.8 | 1.0 |
| $Li_2O$ | | 0.5 | 1.0 |
| $K_2O$ | | 5.0 | 6.7 |
| CaO | | 3.8 | 0.5 |
| MgO | | 1.0 | 0.5 |

These glasses have a refractive index $n_D$=1.50, a linear coefficient of expansion between 30° and 300° C. of 66.2–54.6 and 54.9×10¹⁷, respectively per °C., an annealing point (this is the temperature at which the viscosity $\nu$=10¹³·⁴ poises) of 540° and 487° C., respectively, and a softening point (this is the temperature at which the viscosity $\nu$=10⁷·⁶⁵ poises) of 696°, 697° and 693° C., respectively.

A cylinder having the same length was ground therein consisting of glass of one of the compositions of the following table. This table also states for the relevant glasses the refractive index ($n_D$), the linear coefficient of expansion between 30° and 300° C. (u.c.) the annealing point (HOT) and the softening point (AVP).

| | Composition in percent by weight | | | | | | | | | |
|---|---|---|---|---|---|---|---|---|---|---|
| | 1 | 2 | 3 | 4 | 5 | 6 | 7 | 8 | 9 | 10 |
| $B_2O_3$ | 21.3 | 19.8 | 19.8 | 20.3 | 19.9 | 20.9 | 19.4 | 19.0 | 19.4 | 21.3 |
| $La_2O_3$ | 37.6 | 37.6 | 37.2 | 37.6 | 37.3 | 34.3 | 36.5 | 35.7 | 36.5 | 37.6 |
| $Al_2O_3$ | 3.0 | 3.0 | 2.9 | 2.9 | 2.9 | 2.9 | 2.9 | 2.8 | 2.9 | 2.9 |
| $ZrO_2$ | 8.0 | 8.0 | 7.9 | 8.0 | 7.9 | 7.8 | 7.7 | 7.6 | 7.7 | 8.0 |
| $Nb_2O_5$ | 13.5 | 13.5 | 13.5 | 13.6 | 13.6 | 13.3 | 13.2 | 13.0 | 10.0 | 8.6 |
| $Ta_2O_5$ | 5.6 | 5.6 | 5.5 | 5.6 | 5.6 | 5.5 | 5.4 | 5.3 | 8.6 | 10.6 |
| $ThO_2$ | 11.0 | 11.0 | 12.2 | 11.0 | 12.3 | 8.3 | 13.9 | 15.6 | 13.9 | 11.0 |
| BaO | | 1.0 | 0.5 | 0.5 | 0.5 | 5.0 | 0.5 | 0.5 | 0.5 | |
| $TiO_2$ | | 0.5 | 0.5 | 0.5 | | 2.0 | 0.5 | 0.5 | 0.5 | |
| $n_D$ | 1.87 | 1.89 | 1.91 | 1.88 | 1.88 | 1.87 | 1.88 | 1.88 | 1.88 | 1.85 |
| U.c. ×10⁷ | 69.4 | 71.4 | 71.3 | 70.8 | 69.9 | 72.6 | 71.0 | 71.8 | 70.0 | 70.6 |
| HOT (° C.) | 669 | 664 | 670 | 664 | 661 | 650 | 671 | | 671 | 670 |
| AVP (° C.) | 741 | 742 | 745 | 741 | 738 | 732 | 744 | | 749 | 754 |

The combinations thus obtained were first drawn out to fibers having a diameter of approximately 300/μ at a temperature of between 770° and 780° C. These fibers were bundled to a diameter of 12 mms. and these bundles were again drawn out to 300/μ so that the original fiber acquired a diameter of approximately 6/μ. The composite fibers obtained were cut to lengths of 100 mms. and were bundled in a dense pack in an ampul having a diameter of 25 mms. of borosilicate glass of one of the three first-mentioned compositions. The filled ampul was evacuated, sealed and heated at a temperature of between 680° and 700° C. for one-half to 1 hour. Platelike fiber-optic elements were cut from the product obtained and these were polished.

What is claimed is:

1. Substantially lead-free glass having a refractive index of at least 1.81 and capable of being drawn out several times at a temperature between 700° and 800° C. without crystallizing and suitable as a core of glass fibers which are bundled in a fiber-optic element, said glass consisting essentially of a composition between the following limits in percent by weight:

| | | | |
|---|---|---|---|
| $B_2O_3$ | 19–22 | $Ta_2O_5$ | 4–12 |
| $La_2O_3$ | 34–38 | $ThO_2$ | 8–20 |
| $Al_2O_3$ | 2–5 | BaO | ≤ 6 |
| $ZrO_2$ | 6–9 | $TiO_2$ | ≤ 3 |
| $Nb_2O_5$ | 8–15 | | |

2. Glass as claimed in claim 1, characterized in that it has a composition between the range limited as follows:

| | | | |
|---|---|---|---|
| $B_2O_3$ | 19–21 | $Ta_2O_5$ | 4–10 |
| $La_2O_3$ | 34–38 | $ThO_2$ | 8–20 |
| $Al_2O_3$ | 2–4 | BaO | ≤ 6 |
| $ZrO_2$ | 6–9 | $TiO_2$ | ≤ 3 |
| $Nb_2O_5$ | 10–15 | | |

3. Glass as claimed in claim 1, characterized in that it has a composition within the range limited as follows:

| | | | |
|---|---|---|---|
| $B_2O_3$ | 19–22 | $Ta_2O_5$ | 10–12 |
| $La_2O_3$ | 34–38 | $ThO_2$ | 8–20 |
| $Al_2O_3$ | 2–5 | BaO | ≤ 6 |
| $ZrO_2$ | 6–9 | $TiO_2$ | ≤ 3 |
| $Nb_2O_5$ | 8–10 | | |

* * * * *

UNITED STATES PATENT OFFICE
CERTIFICATE OF CORRECTION

Patent No. 3,615,766        Dated October 26, 1971

Inventor(s) Gertraud A.A. Piesslinger and Hubertus M.J.J. Kunnen

It is certified that error appears in the above-identified patent and that said Letters Patent are hereby corrected as shown below:

Column 2, line 53, "$\eta = 1013.4$" should be -- $\eta = 10^{13.4}$ --;

line 54, "540° and 487°C" should be --540 and 516 and 487°C--;

line 55, "$\eta = 107.65$" should be -- $\eta = 10^{7.65}$ --.

Signed and sealed this 2nd of May 1972.

(SEAL)
Attest:

EDWARD M. FLETCHER, JR.
Attesting Officer

ROBERT GOTTSCHALK
Commissioner of Patents